Aug. 24, 1948.  C. W. LEA  2,447,948
ARTICLE INFEED MECHANISM FOR WRAPPING MACHINES
Filed May 9, 1944  4 Sheets-Sheet 2

INVENTOR.
Charles W. Lea
BY
George S. Hastings
ATTORNEY

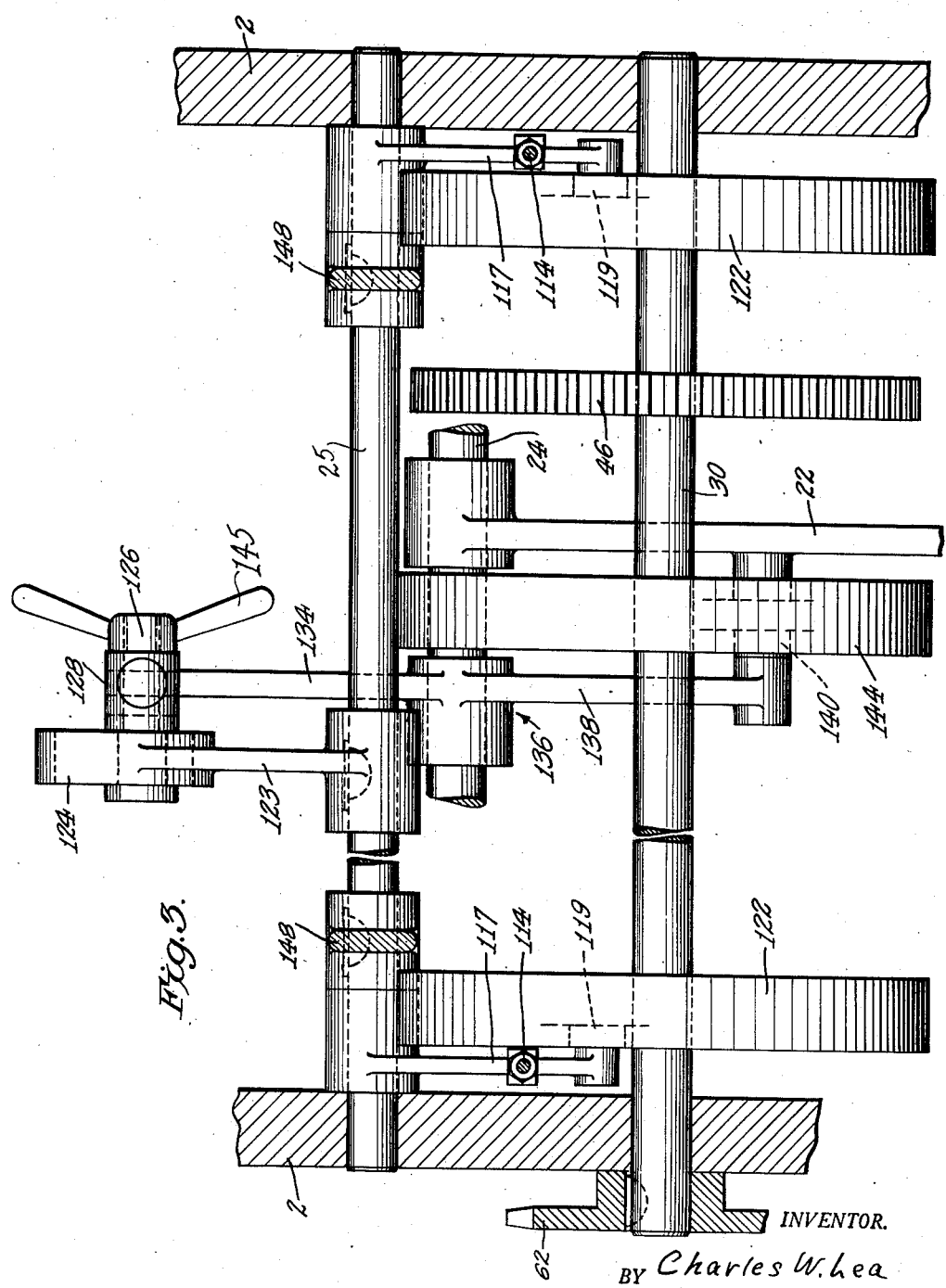

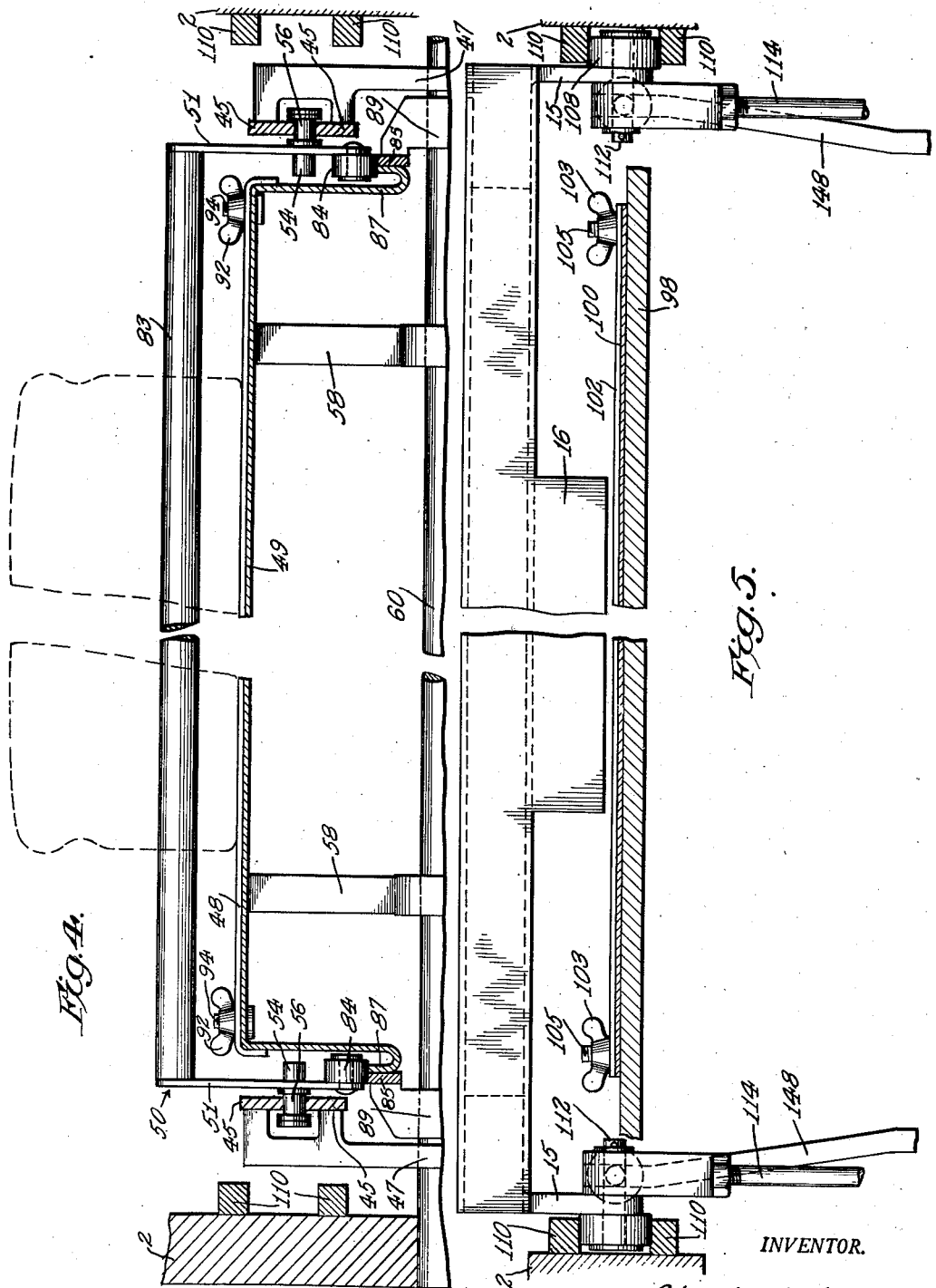

Patented Aug. 24, 1948

2,447,948

UNITED STATES PATENT OFFICE 2,447,948

ARTICLE INFEED MECHANISM FOR WRAPPING MACHINES

Charles W. Lea, Valley Stream, N. Y., assignor to American Machine and Foundry Company, a corporation of New Jersey Application May 9, 1944, Serial No. 534,768

15 Claims. (Cl. 93—2)

This invention relates to wrapping machines, and more particularly to wrapping machines of the type employing a lifter table which is movable substantially vertically in order to transport an article, such as a loaf of bread, partially encircled with a wrapper, from an article receiving position to an article delivery position where the partially wrapped article is removed from the lifter table and transported along a foldway to complete the enwrapment of the article.

The mechanism constituting the present invention relates particularly to machines of the general type, shown in Ferenci patent, No. 2,133,503, issued October 18, 1939, although it is to be noted that it is not limited to such machines only, and may be applied to other types of wrapping machines.

The present invention seeks to overcome disadvantages heretofore encountered in associating an article to be wrapped with a web or sheet of wrapping material. It has been quite difficult to provide for proper handling of articles of different sizes and insure that each article is so located that it can always engage a wrapper in a proper manner, regardless of the width of an article being wrapped. The invention, therefore, relates to improved mechanism for positioning an article, such as a loaf of bread of any width, with its leading edge closely adjacent a wrapper before it is moved by any suitable means onto the lifter table.

The invention further consists in the provision of means for delivering an article to an intermediate position closely adjacent a wrapper and insuring that further travel of the article and engagement thereby with the wrapper shall be substantially simultaneous regardless of the width of an article being wrapped.

It is a further object of the invention to provide mechanism for positioning articles of any width with the leading edges thereof closely adjacent a wrapper prior to the movement of each article against the wrapper onto the lifter table, and insuring that the speed of contact between an article and a wrapper shall be at a minimum rate of travel at the beginning of the movement of an article and wrapper onto the lifter table.

It is also an object of the invention to utilize the entire stroke of the conveying means, such as a pusher, which engages the article and delivers it with the wrapper onto the lifter table wherein article contact with the wrapper is made at a low starting velocity instead of at maximum velocity as in present known practices where the pusher stroke is fixed to the widest article and average articles being wrapped are only about half the width of the widest article.

According to the invention, the desired location of an article, such as a loaf of bread, at an intermediate position adjacent a wrapper held in its path of travel, is accomplished by advancing a loaf along an infeed guideway by means of any suitable means such as a cam controlled flight on an endless conveyor which travels through a gap between a support table and the infeed guide when the loaf has been positioned closely adjacent the wrapper in which it is to be enclosed.

Since in the trade, loaves of varying widths are wrapped on the same machine, it is highly desirable that each loaf, regardless of its width, be subjected to the same treatment both in being positioned adjacent the wrapper and when being moved with the wrapper onto the lifter table. Accordingly, mechanism has been provided for insuring that each loaf will be properly positioned and that the pusher which advances a loaf onto the lifter table from the intermediate position may have a variable stroke controlled by adjustable means in accordance with the width of the loaf being wrapped. This mechanism substantially eliminates loaf constriction and destruction formerly resulting from pusher action, and also insures more uniform folding of a wrapper around an article.

It is also an object of my invention to provide article conveying means operating in timed relation, such that articles are moved sideways in a substantially straight line path of travel wherein one conveyor mechanism disposes an article to be wrapped closely adjacent a wrapper and another conveyor mechanism moves into engagement with such article as disposed and conveys it with a wrapper onto a lifter table without subjecting the article being wrapped to excess constricting forces which would thereby tend to distort the article and interfere with the most efficient folding of the wrapper about the article.

My invention also contemplates the provision of article guiding and supporting mechanism with which cooperates conveying mechanism and means for adjusting the guiding and supporting mechanism to conform with variations in width of articles being wrapped such that each article may be properly positioned relative to a wrapper regardless of variations in width.

Other objects of my invention will be set forth in the following description and drawings which illustrate the preferred embodiment thereof, it being understood that the above statement of the objects of my invention is intended generally to explain the same without limiting it in any manner.

In the accompanying drawings which form a part of this specification, and wherein the several reference characters designate the same or like elements:

Figure 3 is a sectional view taken on line 3—3 of Figure 2;

Figure 4 is a sectional view taken on line 4—4 of Figure 2; and

Figure 5 is a sectional view taken on line 5—5 of Figure 2.

Figure 1:
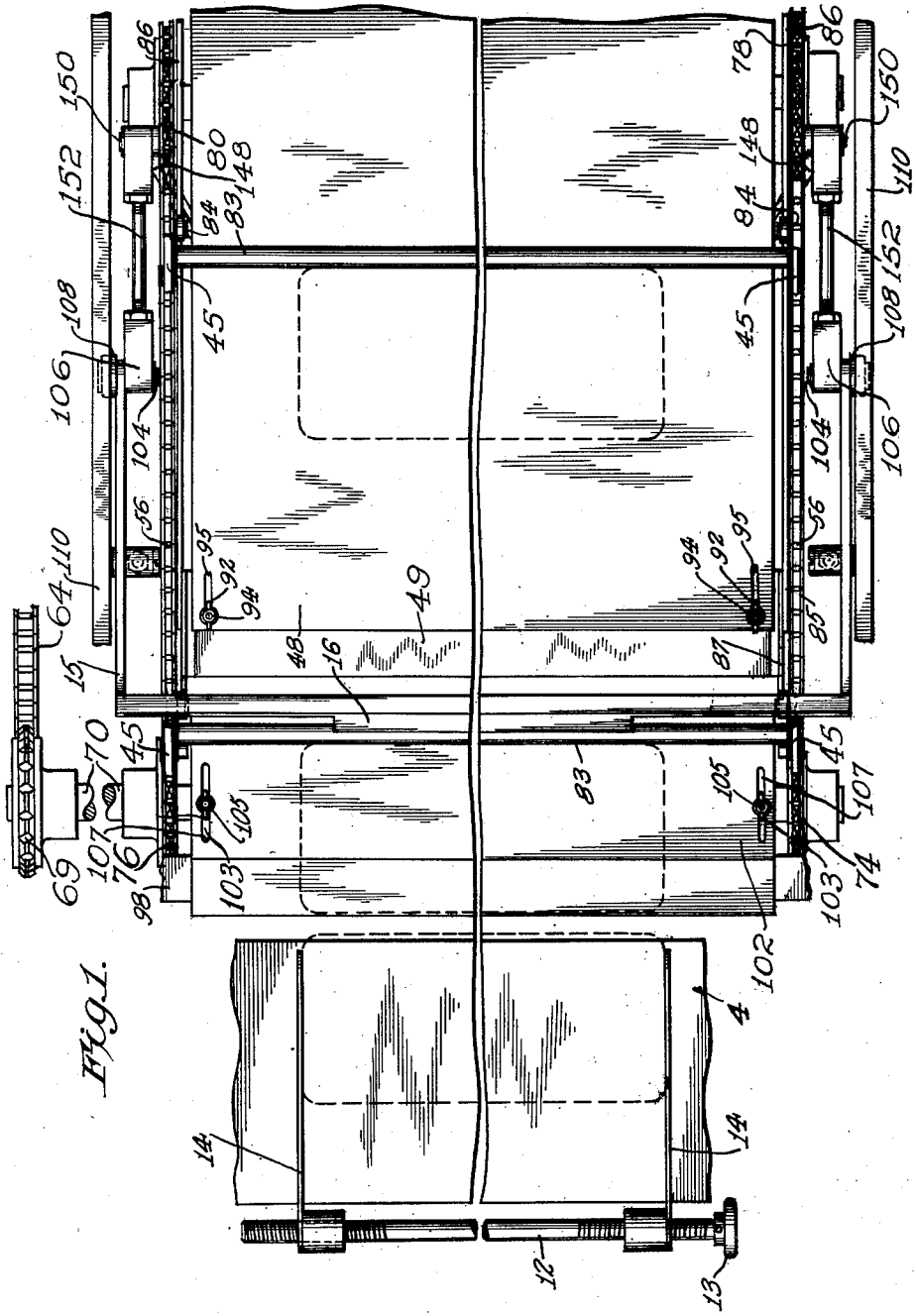
Figure 1 is a partial, somewhat diagrammatic, plan view of the mechanism illustrated in Figure 2.
Figure 2:
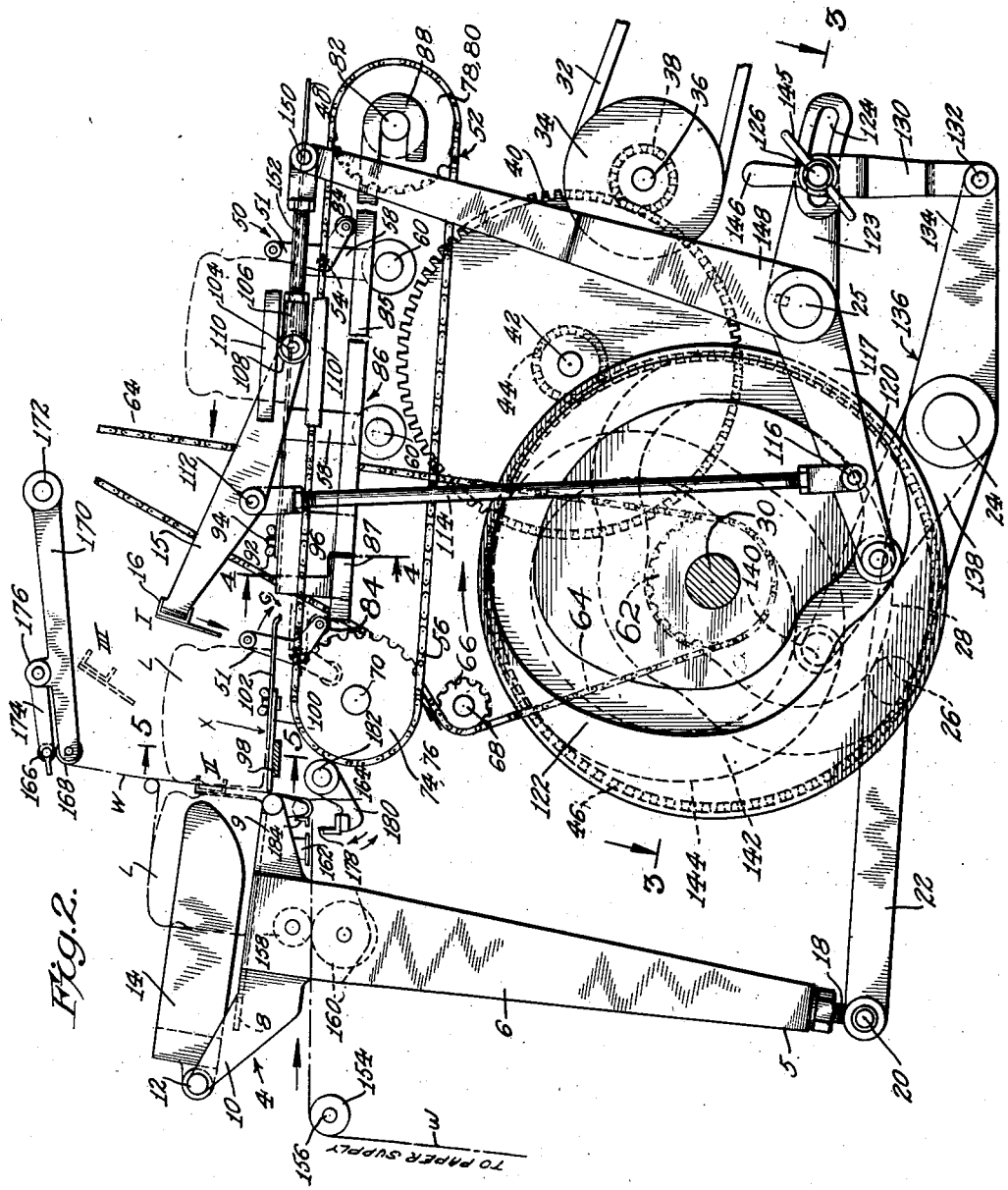
Figure 2 is a side elevation of the mechanism constituting the invention.

Referring to the drawings, Figures 1 and 2 show a wrapping machine of the general type disclosed in Ferenci patents, No. 2,082,945 and No. 2,133,503. The machine is provided with the usual side frames 2 in which are mounted the several elements and mechanisms making up its operative structure. A lifter table, designated generally 4, suitably mounted for substantially vertical movement in guides (not shown) mounted on side frames 2, consists of a yoke member 5 provided with spaced, substantially vertical bars 6 which carry at their upper ends an article supporting plate 8 carried between brackets 9, and brackets 10, in which is mounted a rod 12 supporting end tuckers 14 which make the first or end folds in a wrapper W as an article, such as a loaf of bread L, is advanced by a pusher 16 onto plate 8. Rod 12 may be provided in a known manner with right-left hand threads and a hand wheel 13 fixed thereto for adjusting tuckers 14 to and from each other in order that the machine may be adapted to wrap loaves of varying lengths.

Secured to the lower end of yoke member 5 is a threaded rod 18 which is pivotally connected at 20 to lever 22 fulcrumed on shaft 24 suitably mounted in side frames 2. Lever 22 is provided with a cam follower 26 tracking a cam 28 on shaft 30 mounted in side frames 2. By means of this structure, rotation of cam 28 causes lifter table 4 to be moved with an article L and a wrapper partially folded thereabout upwardly from article receiving position to a delivery station (not shown) where the partially enwrapped article is ejected from the lifter table onto a foldway (not shown) where wrapping operations are completed. Since the final wrapping mechanism forms no part of the present invention, further description and disclosure is omitted. However, it is noted that mechanism similar to that disclosed in the above referred to Ferenci patent, No. 2,082,945, may be employed.

Shaft 30 is driven by a motor or other source of power (not shown) through a belt 32 running on a pulley 34 on shaft 36 to which is fixed a gear 38 meshing with gear 40 mounted adjacent one side of the machine on the main drive shaft 42 provided with a gear 44 meshing with gear 46 fixed to shaft 30.

In the embodiment selected for purposes of illustration, each article L, such as a loaf of bread, is moved in spaced succession sideways in substantially a straight line path of movement along an infeed guide member 48 by spaced flights 50 mounted on an endless conveyor designated generally 52. As shown in Figures 2 and 4, guide member 48 may be supported in operative arrangement in the machine by means of uprights 58 fixed to cross bars 60 secured in side frames 2. Flights 50 of conveyor 52 are mounted on levers 51 which are swiveled on extension pins 54 of chains 56, running longitudinally with respect to infeed guide member 48. For proper flight engagement with an article, it is preferred to maintain the upper runs of the spaced, parallel conveyor chains 56 substantially horiontal, and for that purpose there are provided longitudinal guide bars 45 which engage the opposite sides of the upper runs of the chains 56. Guide bars 45 (Figure 4) may be mounted on brackets 47 secured to bars 60.

Conveyor 52 is driven in proper timed relation with the other moving parts of the machine by means of sprocket 62 fixed to shaft 30 through a sprocket chain 64 which travels on sprocket 62 over an idler sprocket 66 on shaft 68 suitably mounted in side frames 2 thence over a sprocket 69 on shaft 70 which mounts spaced sprockets 74, 76 supporting chains 56 of endless conveyor 52. Chain 64 also travels over a sprocket 65 which drives the conveyor mechanism (not shown) employed in moving wrapped articles away from the wrapping mechanism (not shown). Chains 56 also travel over spaced sprockets 78, 80 on shaft 82.

Referring to Figures 1, 2 and 4, it will be seen that a loaf engaging flight or cross bar 83 is connected at its ends to levers 51, which levers also carry cam followers 84 adapted to run on elongated cams 86. In this way in traveling up and around curved portions 88 of cams 86, each flight is swung up into engagement with the rear face of a loaf of bread to transport the same along member 48 en route to the lifter table 4. Although a single cam 86 may be employed, as indicated in Figure 1, it is preferred to employ two cams 86 for controlling the position of conveyor flights 84. Each cam is made up of two sections; a fixed section 85 mounted on brackets 89 secured to bars 60, and an adjustable extension section 87. This latter section may form a part of an extension 49 which is adjustably supported by member 48, so that the period of engagement of cam followers 84 of flights 50 can be varied in accordance with the width of an article to be wrapped.

Wing nuts 92 cooperating with screws 94 carried by extension 49 and extending upwardly through elongated slots 95 in guide member 48 are employed to secure extension 49 in adjusted position relative to guide member 48, and cam sections 87 in proper adjusted relationship relative to fixed sections 85.

Referring to Figure 2, it will be seen that each article being moved along member 48 by a flight 50 is delivered therefrom to an intermediate feeding position "X" closely adjacent a wrapper or wrapper web W located to be engaged by each article to be wrapped as it is moved by pusher 16 onto the lifter table 4.

The means for supporting the article at the intermediate position "X" consists of a cross bar 98 suitably attached to the side frames 2 of the machine and having fixed thereto a substantially horizontal transverse plate 100 upon which is adjustably mounted a plate or extension 102. Wing nuts 103 on screws 105 carried by plate 100 and extending upwardly through elongated slots 107 in plate 102 are employed to secure plates 100 and 102 in any desired adjusted arrangement.

As indicated by the arrow in Figure 2, and as shown in dotted lines, each vertical arm 51 of a conveyor flight 50 is adapted to swing downwardly into the gap G between the rear end of plate 102 on plate 100 and the front edge of extension 49 which is mounted on guide member 48. In this manner, plates 49 and 102 can be adjusted to and from each other to compensate for changes in the width of different series of loaves or other articles being wrapped. The adjustments are such that the gap G can be maintained substantially constant or of such a width that cross bar 84 of each flight can always swing clear and downwardly between the two plate members as cam followers 84 run off the end of cam sections 87 due to the continued forward travel of conveyor 52, regardless of adjustments necessary to accommodate articles of different widths.

As indicated hereinabove, in machines of this type, articles to be wrapped have been advanced to an intermediate position prior to delivery by a conveyor against a wrapper onto a lifter table. However, when a different batch of articles, such as loaves of bread, are to be wrapped, if such loaves are of a greater or lesser width than a previous batch, such loaves would be located unsatisfactorily relative to the depending wrapper W. Therefore, in being moved with a wrapper onto the lifted table, when the conveying means in its forward travel engaged the loaf, it would be traveling at maximum velocity so that the impact of the loaf against the wrapper would be considerable, and might cause constriction and crushing thereof, as well as a non-uniform association of a loaf and its wrapper tending to result in unsatisfactory packages. This condition arises because in machines of this type it has been customary to set the stroke of the pusher in accordance with the widest article or loaf to be wrapped. Hence, it is obvious that in any loaf or article of lesser width, the travel of the introducing pusher usually is approaching maximum velocity at the time a loaf is engaged thereby.

According to the present invention, however, the above mentioned disadvantages have been overcome, both by the provision of the conveyor 52 described hereinabove and because means are provided for controlling the operation of pusher 16. Pusher 16 is mounted on spaced arms 15 pivoted at 104 to pins 106 provided with rollers 108 traveling between spaced bars 110 suitably fixed to the side frames 2 of the machine (Figures 1, 2 and 4).

Pivotally connected at 112 is an adjustable pitman 114 which at its other end is pivotally connected at 116 to a lever 117 fulcrumed on shaft 25. Lever 117 is provided with a cam follower 119 running in a track 120 in cam 122 fixed to shaft 30. The above described mechanism preferably is duplicated and hence only one need be described.

Fixed to shaft 25 is a lever 123 having an elongated arcuate slot 124 in which is adjustably mounted a pin 126 carried by hub 128 on lever 130 pivoted at 132 to an arm 134 of lever 136 fulcrumed on shaft 24 (Figure 2). Lever 136 also has an arm 138 provided with a cam follower 140 which travels in a track 142 of cam 144 fixed to shaft 30. Wing nut 145 on pin 126 is employed for securing the pin in locked position so that by means of handle 146, pine 126 can be swung along with lever 130 back and forth in slot 124 in order that the position of levers 148 keyed to shaft 25 may be determined in accordance with the width of the article being wrapped. The free ends of levers 148 are pivotally connected at 150 to adjustable pitmans 152 which at their other ends are connected to pins 106.

By means of the mechanism described hereinabove, pusher 16 is constrained to move through a substantially closed unidirectional path from the full line position indicated at I (Figure 2) to dotted line position II, at which time an article is delivered with a wrapper onto lifter table 4, thence upwardly to position III and back to position I. The adjustable pitmans 114 are set so that the upward travel of pusher 16 above and away from an article delivered onto the lifter table is sufficient to clear the top of any article to be wrapped as the pusher returns to position I. This is substantially as indicated at III in Figure 2. By means of the arcuate slot 124 in arm 123, lever 130 and associated elements, the rearmost limits of movement of the pusher can be controlled in order that articles, such as loaves of bread, of various width can be wrapped, yet at the same time it is assured that the point of engagement of an article of any width can be predetermined and forward movement of the pusher 16 will always take place at the same time in the movement of an article from plates 100, 102 onto the lifter table.

Although the mechanism for supplying wrappers forms no specific part of this invention, mechanism somewhat similar to that disclosed in Ferenci patent, No. 2,133,503 may be employed. The web of paper W is fed from a suitable supply over a roller 154 mounted on shaft 156 supported in the side frames 2 between feed rollers 158, 160 carried on the lifter table, thence beneath a guide 162 on the table 4 about roller 164 where it is held between a pair of rollers 166, 168. Roller 168 is supported between arms 170 fixed to a shaft 172 mounted on suitable uprights fixed to the frame of the machine (not shown). Roller 166 is pivotally mounted on arms pivoted on shaft 176 on arms 170. At the proper time, such as when the wrapper is disposed in the path of travel of an article about to be moved onto the lifter table 4 (as shown in Figure 2), a knife 178 mounted on spaced arms 180 fixed to shaft 182 mounted on side frames 2 is moved upwardly into engagement with the ledger plate 184, to sever the wrapper after which the lifter table moves upwardly with a partially wrapped loaf to deliver the same to the wrapping mechanism.

The invention above described may be varied in construction within the scope of the claims, for the particular device selected to illustrate the invention, is but one of many possible concrete embodiments of the same. It is not, therefore, to be restricted to the precise details of the structure shown and described.

What is claimed is:

1. In a wrapping machine having an article lifter table constructed and arranged to move an article from a receiving station to a delivery station, and means for positioning a wrapper in the path of travel of said article adjacent said receiving station, an article support, an article guide, a device for engaging and moving an article along said guide and positioning said article on said support in close proximity to said wrapper, means for moving said device out of engagement with said positioned article and means operative after said article has been positioned on said support closely adjacent said wrapper for moving said article against said wrapper and onto said lifter table.

2. In a wrapping machine having a lifter table constructed and arranged to move an article from a receiving station to a delivery station, and means for holding a wrapper in the path of travel of said article at said receiving station, an article support, an article guide, means for delivering an article along said guide and locating said article on said support in close proximity to said wrapper, mechanism for adjusting the amount of movement of said last-named means to conform with the width of the article being moved thereby onto said support, and means operative when said article has been positioned on said support closely adjacent said wrapper for moving said article against said wrapper and onto said lifter table.

3. In a wrapping machine, a lifter table constructed and arranged to move with an article and a wrapper from a receiving station to a delivery station, an article support, means for holding a wrapper web in the path of movement of said article, a first conveyor for moving an article onto said support, means for adjusting the extent of movement of said article on said support by said first conveyor, said last-named means being constructed and arranged to limit the travel of an article on said support to a point closely adjacent said wrapper web, and a second conveyor operative after said article has been positioned on said support adjacent said wrapper for moving said article against said wrapper and onto said table.

4. In a wrapping machine, a lifter table constructed and arranged to move with an article and a wrapper from a receiving station to a delivery station, an article support, means for holding a wrapper web in the path of movement of said article, a first conveyor for moving an article onto said support, means for limiting the extent of movement of said article on said support by said first conveyor to a distance which places the article to be wrapped substantially adjacent the wrapper, said last-named means being constructed and arranged to be adjusted to accommodate articles of different widths, a second conveyor operative after said article has been positioned on said support adjacent said wrapper for moving said article against said wrapper and onto said table, and means for adjusting the amount of travel of said second conveyor to conform with the average width of articles being wrapped.

5. A wrapping machine having a lifter table adapted to move with an article from a receiving station to a delivery station, means for holding a wrapper draped in the path of travel of an article onto said table, a support, said support including a plate adjustably mounted on said support, a first conveyor for delivering an article sideways onto said support to a position in close proximity to said wrapper, spaced flights on said conveyor, means for guiding said flights for controlled movement away from an article after the delivery of said article to said position on said support in close proximity to said wrapper, including a stationary cam, a second conveyor, and means for operating said second conveyor to move said article sideways from said support with said wrapper and onto said lifter table.

6. In a wrapping machine having an article lifter table constructed and arranged to move with a partially wrapped article from a receiving to a delivery station, and means for holding a wrapper in the path of movement of said article at said receiving station; a support, a plate adjustably mounted on said support, a guide member aligned with said support and spaced therefrom, an article support extension adjustably mounted on said member, means for securing said plate and extension in adjusted positions on said support and member in accordance with the width of articles being wrapped, article engaging mechanism for moving articles along said member and onto said support, means adjusting the distance of travel of said article engaging mechanism to limit the travel of said article to a predetermined position closely adjacent said wrapper, a conveyor, and means for operating said conveyor in timed relation with said article engaging mechanism to advance said article from said predetermined position with said wrapper onto said lifter table.

7. In a wrapping machine having an article lifter table constructed and arranged to move with a partially wrapped article from a reclining to a delivery station, and means for holding a wrapper in the path of movement of said article at said receiving station; a support, a plate adjustably mounted on said support, a guide member aligned with said support and spaced therefrom, an article support extension adjustably mounted on said member, means for securing said plate and extension in adjusted positions on said support and member in accordance with the width of articles being wrapped, an article engaging device for moving articles along said member and onto said support, means adjusting the travel of said article engaging device to limit the travel of said article to a predetermined intermediate position closely adjacent said wrapper, a conveyor, means for operating said conveyor in timed relation with said article engaging device to advance an article from said intermediate position with said wrapper onto said lifter table, said last-named means including mechanism for adjusting the forward travel of said conveyor to conform with the average width of articles being moved.

8. In a wrapping machine having an article lifter table constructed and arranged to move with a partially wrapped article from a receiving to a delivery station, and means for holding a wrapper in the path of movement of said article at said receiving station, an article support, a plate adjustably mounted on said support, a guide member aligned with said support and spaced therefrom, an article support extension adjustably mounted on said member, means for securing said plate and extension in adjusted positions on said support and member in accordance with the width of articles being wrapped, a first conveyor, a plurality of spaced article engaging flights on said conveyor, means for adjusting the distance each of said flights engages with and propels an article along said member and onto said support to locate each article moved onto said support at a predetermined intermediate position closely adjacent said wrapper, said flights being constructed and arranged to move out of engagement with an article after locating the same on said support, a second conveyor, and means for operating said second conveyor in timed relation to said first conveyor to move a positioned article from said intermediate position with said wrapper onto said lifter table.

9. In a wrapping machine, mechanism for conveying an article to be wrapped onto a lifter table comprising an endless conveyor, a plurality of spaced flights on said conveyor, an article support, means mounting said support for delivery of an article to said lifter table, an article guide spaced from said support, means for driving said conveyor to cause a flight to engage and feed an article along said guide for delivery to said support, a device for adjusting the period of engagement of an article by said flight constructed and arranged to locate said article at a predetermined intermediate position on said support, said device comprising, an adjustable cam, and a cam follower on each flight tracking said cam, said cam having a surface constructed and arranged to allow each flight to swing down between said support and guide, a pusher for moving each located article from said support onto said lifter table, and means for adjusting the stroke of said pusher to handle articles of the width being wrapped.

10. In a wrapping machine having a lifter table constructed and arranged to move an article from a receiving station to a delivery station, and means for holding a wrapper in the path of travel of said article at said receiving station, an article support, an article guide, conveying means for delivering an article along said guide and locating said article on said support in close proximity to said wrapper, mechanism for adjusting said conveying means to control the amount of movement of said conveying means with an article in conformity with the width of the article being moved thereby onto said support, and mechanism operative when said article has been positioned on said support closely adjacent said wrapper for moving said article against said wrapper and onto said lifter table, said mechanism comprising a pusher, and means for moving said pusher in a substantially closed path into and out of engagement with each article advanced.

11. In a wrapping machine, a lifter table constructed and arranged to move with an article and a wrapper from a receiving station to a delivery station, an article support, means for holding a wrapper web in the path of movement of said article, a first conveyor for moving an article onto said support to a point closely adjacent said wrapper web, means for adjusting the distance said first-named conveyor moves articles on said support to position articles of other widths at a point closely adjacent said wrapper web, and a second conveyor operative after said article has been positioned on said support adjacent said wrapper for simultaneously engaging and moving said article with said wrapper onto said table.

12. In a wrapping machine, a lifter table constructed and arranged to move with an article and a wrapper from a receiving station to a delivery station, an article support, means for holding a wrapper web in the path of movement of said article, a first conveyor having spaced flights for moving an article onto said support, adjustable means for limiting the extent of movement of said article on said support by said first conveyor, said adjustable means comprising adjustable cams constructed and arranged to be engaged by said flights to limit the travel of each article on said support to an amount which places the article at a position closely adjacent said wrapper web, a second conveyor operative after said article has been positioned on said support adjacent said wrapper for moving said article against said wrapper and onto said table, means for adjusting the travel of said second conveyor to correspond with the width of the articles being wrapped, and mechanism for moving said second conveyor clear of an article being advanced by a flight of said first conveyor.

13. A wrapping machine having a lifter table adapted to move with an article from a receiving station to a delivery station, means for holding a wrapper draped in the path of travel of an article onto said table, a support, said support including a plate adjustably mounted on said support, a first conveyor for delivering an article sideways onto said support to a position in close proximity to said wrapper, spaced flights on said conveyor, cam followers on each of said flights, means for guiding said flights for controlled movement away from an article upon delivery of said article to said position on said support in close proximity to said wrapper, including adjustable stationary cams, a second conveyor, and means for operating said second conveyor to move said article sideways from said position on said support with said wrapper and onto said lifter table, means mounting said cams along the article engaging path of travel of said flights, and means for adjusting said cams to insure delivery of each article to said position on said support in close proximity to said wrapper in accordance with the article width.

14. In a wrapping machine having an article lifter table constructed and arranged to move with a partially wrapped article from a receiving to a delivery station, and means for holding a wrapper in the path of movement of said article at said receiving station; a support, a plate adjustably mounted on said support, a guide member aligned with said support and spaced therefrom, an article support extension adjustably mounted on said member, means for securing said plate and extension in adjusted positions on said support and member in accordance with the width of articles being wrapped, a first conveyor having article engaging apparatus for moving articles sideways along said member and onto said support, adjusting means for limiting the travel of said apparatus to an amount sufficient to locate said article on said support at a predetermined intermediate position closely adjacent said wrapper whereby further forward movement of said article and engagement of a wrapper thereby is substantially simultaneous, a second conveyor, means for operating said second conveyor in timed relation with said first conveyor to advance said article from said intermediate position with said wrapper onto said lifter table, and mechanism synchronizing the operation of said conveyors, including means for moving said second conveyor clear of an article being advanced by the article engaging apparatus of said first conveyor.

15. In a wrapping machine having an article lifter table constructed and arranged to move an article from a receiving station to a delivery station, and means for positioning a wrapper in the path of travel of said article adjacent said receiving station, an article support adjoining said receiving station, an article runway adjoining said article support, mechanism for advancing articles sidewise over said runway and said support to position the leading side of each article closely adjacent said wrapper, a device adapted and arranged to change the distance said mechanism forwards articles along said support to position the leading side of articles of different widths closely adjacent the wrapper, a pusher constructed and arranged to engage and push each article against the wrapper with a low starting velocity onto said lifter table.

CHARLES W. LEA.

REFERENCES CITED

The following references are of record in the file of this patent:

UNITED STATES PATENTS

| Number | Name | Date |
|---|---|---|
| 2,082,408 | Lyon | June 1, 1937 |
| 2,082,945 | Ferenci | June 8, 1937 |
| 2,356,644 | Arelt | Aug. 22, 1944 |